(12) United States Patent
Aas

(10) Patent No.: US 9,928,408 B2
(45) Date of Patent: Mar. 27, 2018

(54) SIGNAL PROCESSING

(71) Applicant: International Business Machines Corporation, Armonk, NY (US)

(72) Inventor: Cecilia J. Aas, Saffron Walden (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/185,196

(22) Filed: Jun. 17, 2016

(65) Prior Publication Data
US 2017/0364740 A1   Dec. 21, 2017

(51) Int. Cl.
*G06K 9/00* (2006.01)
*G06K 9/62* (2006.01)
*G06K 9/48* (2006.01)

(52) U.S. Cl.
CPC ........... *G06K 9/00288* (2013.01); *G06K 9/00* (2013.01); *G06K 9/00228* (2013.01); *G06K 9/481* (2013.01); *G06K 9/6215* (2013.01)

(58) Field of Classification Search
CPC ......... G06F 17/30256; G06F 17/30097; G06F 17/30109; G06F 17/30259; G06F 17/30271; G06F 17/3028; G06F 17/30598; G06F 17/30265; G06F 3/0483; G06F 3/0485; A01M 1/026; A01M 1/145; A01M 3/005; G06K 2009/4695; G06K 2209/29; G06K 9/4652; G06K 9/4671; G06K 9/00201; G06K 9/6272; G06K 9/4676; G06K 9/66; H04W 4/027; H04W 4/028; H04W 64/00; G10L 16/02; G10L 25/87; Y10S 707/99937; G06N 3/04; G06N 3/088; G06N 3/08; H03F 1/3247; H03F 1/3282;
(Continued)

(56) References Cited

U.S. PATENT DOCUMENTS 5,461,698 A * 10/1995 Schwanke ............ G06K 9/6253
706/20
5,479,575 A * 12/1995 Yoda .................... G06K 9/6272
706/20
(Continued)

FOREIGN PATENT DOCUMENTS

WO   2015048232 A1   4/2015

OTHER PUBLICATIONS

Chen et al., "Hierarchical Browsing and Search of Large Image Databases," IEEE Transactions on Image Processing, vol. 9, No. 3, Mar. 2000, pp. 442-455.
(Continued)

*Primary Examiner* — Aklilu Woldemariam
(74) *Attorney, Agent, or Firm* — Robert J. Shatto

(57) ABSTRACT

A computer-implemented method is provided for classifying an input signal against a set of pre-classified signals. A computer system may calculate, for each of one or more signals of the set of pre-classified signals, a parallelism value indicating a level of the parallelism between that signal and the input signal. The computer system may calculate, for a first subset of the set of pre-classified signals, a sparse vector, wherein each element of the sparse vector serves as a coefficient for a corresponding signal of the first subset. The computer system may determine, for each of the signals in the set of pre-classified signals, a similarity value indicating a level of similarity between that signal and the input signal.

13 Claims, 6 Drawing Sheets

(58) Field of Classification Search
CPC ....... H03F 2200/102; H03F 2201/3233; A61B 5/04325; A61B 5/04525; A61B 5/7203; A61B 5/7232; A61B 5/7264; A61B 5/024; A61B 5/14546; A61B 5/055; A61B 5/4821; A61B 5/7246; A61B 5/7257; A61B 5/726; G01R 13/0254; G01R 13/029; G01R 33/56341
USPC ....... 382/118, 201, 159, 181, 190, 232, 240, 382/248, 276, 312, 239, 224, 162, 110, 382/254
See application file for complete search history.

(56) References Cited

U.S. PATENT DOCUMENTS

| | | | | |
|---|---|---|---|---|
| 5,822,742 | A * | 10/1998 | Alkon | G06K 9/4628 382/159 |
| 6,327,583 | B1 * | 12/2001 | Kindo | G06N 99/005 706/16 |
| 7,328,053 | B1 * | 2/2008 | Diab | A61B 5/14546 600/323 |
| 7,916,951 | B2 | 3/2011 | Landwehr et al. | |
| 8,396,310 | B1 | 3/2013 | Kadambe et al. | |
| 8,463,045 | B2 * | 6/2013 | Yang | G06F 17/30256 382/190 |
| 2002/0101938 | A1 * | 8/2002 | Horaguchi | H03F 1/3247 375/297 |
| 2006/0230140 | A1 * | 10/2006 | Aoyama | G06N 3/08 709/224 |
| 2007/0036400 | A1 * | 2/2007 | Watanabe | G06K 9/001 382/124 |
| 2008/0026410 | A1 * | 1/2008 | Vlahou | A61K 45/06 435/7.23 |
| 2011/0222785 | A1 * | 9/2011 | Hirohata | G06K 9/00288 382/224 |
| 2014/0108020 | A1 * | 4/2014 | Sharma | G10L 19/018 704/500 |
| 2014/0142958 | A1 * | 5/2014 | Sharma | G10L 19/018 704/500 |
| 2014/0270476 | A1 * | 9/2014 | Cameron | G06K 9/00201 382/154 |
| 2015/0004998 | A1 * | 1/2015 | Pennanen | H04W 4/02 455/456.1 |
| 2015/0071552 | A1 | 3/2015 | Lavi et al. | |

OTHER PUBLICATIONS

Grauman, K., "Efficiently Searching for Similar Images," http://www.cs.uteas.edu/~grauman/papers/grauman_cacm_extended.pdf, 11 pgs., Department of Computer Sciences, University of Texas at Austin, extended version of an invited article that will appear in the Communications of the ACM (CACM) in 2009.

Greenacre et al., "Chapter 6 Measures of distance and correlation between variables," Multivariate Analysis of Ecological Data, 14 pgs, first published Dec. 2013, BBVA Foundation Manuals, ISBN-13: 978-84-92937-50-9.

Greenacre et al., "Chapter 6 Measures of distance and correlation between variables," http://www.econ.upf.edu/~michael/stanford/maeb6.pdf, 10 pgs.

Sinjur et al., "Image Similarity Search in Large Databases Using a Fast Machine Learning Approach," Abstract, http://rd.springer.com/chapter/10.1007%2F978-3-540-68127-4_9, 4 pgs., printed Jun. 8, 2016.

Unknown, "holycrapscience!", http://holycrapscience.tumblr.com/post/1241604136/holy-crap-l1-minimizing, 6 pgs., printed May 31, 2016.

Yang et al., "Fast I1—Minimization Algorithms for Robust Face Recognition," IEEE Transactions on Image Processing, vol. 22, No. 8, Aug. 2013, pp. 3234-3246.

Yang et al., Fast I-1 Minimization Algorithms: Homotopy and Augmented Lagrangian Method—Implementation from Fixed-Point MPUs to Many-Core CPUs/GPUs, http://people.eecs.berkeley.edu/~yang/software/l1benchmark/, printed May 8, 2016, 2 pgs.

Zhang et al., "A Survey of Sparse Representation: Algorithms and Applications," IEEE Access, vol. 3, 2015, DOI: 10.1109/ACCESS.2015.2430359, http://ieeexplore.ieee.org/stamp/stamp.jsp?arnumber=7102696&tag=1, pp. 490-530, © 2015 IEEE.

* cited by examiner

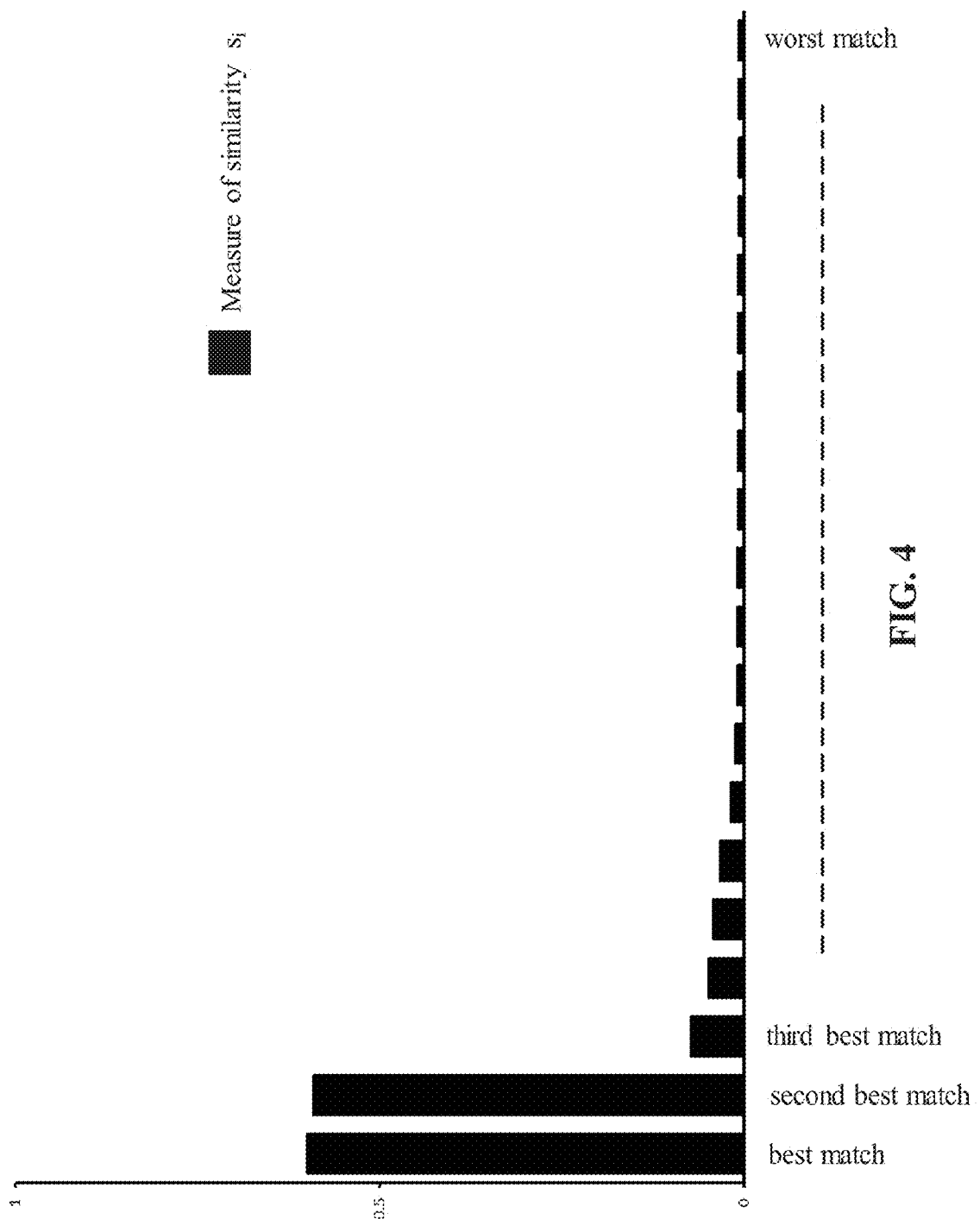

SIGNAL PROCESSING

BACKGROUND

The present disclosure relates generally to the field of signal processing, and more particularly to the classification of a signal against a set of pre-classified signals.

Signal classification aims to determine how likely an input (or probe) signal is to belong to particular categories or classes of signals that are already known. Typically, a signal classification system compares the input signal to a set of signals which are representative of each of the known classes of signals in order to assess the likelihood or probability that the input signal belongs to each class. These probabilities may then be used to determine a particular class that the input signal is deemed to belong to.

Standard sparse representation solvers are known which use a variety of known algorithms and techniques to solve an equation Ax=b subject to x being as sparse as possible. Such sparse representation solvers typically accept a matrix A and a vector b as inputs and output a sparse vector x as an output.

SUMMARY

Embodiments of the present disclosure include a method, computer program product, and system for classifying an input signal against a set of pre-classified signals. A computer system may calculate, for each of one or more signals of the set of pre-classified signals, a parallelism value indicating a level of the parallelism between that signal and the input signal. The computer system may calculate, for a first subset of the set of pre-classified signals, a sparse vector, wherein each element of the sparse vector serves as a coefficient for a corresponding signal of the first subset. The computer system may determine, for each of the signals in the set of pre-classified signals, a similarity value indicating a level of similarity between that signal and the input signal. The determination of the similarity value for at least one of the signals in the first subset may be based, at least in part, on the value of the corresponding element of the sparse vector. The determination of the similarity value for at least one of the one or more signals may be based, at least in part, on the calculated parallelism value for that signal.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4 is a chart that schematically illustrates the match value distribution (or response) that is provided by the similarity values calculated by an example embodiment of the disclosure when applied to facial recognition.

DETAILED DESCRIPTION

Aspects of the present disclosure relate generally to the field of signal processing, and in particular to classifying an input signal against a set of pre-classified signals. While the present disclosure is not necessarily limited to such applications, various aspects of the disclosure may be appreciated through a discussion of various examples using this context. It will be appreciated that the disclosure is not limited to the embodiments that are described, and that some embodiments may not include all the features that are described below. Various modifications and changes may be made herein without departing from the broader spirit and scope of the disclosure as set forth in the claims.

Figure 1:
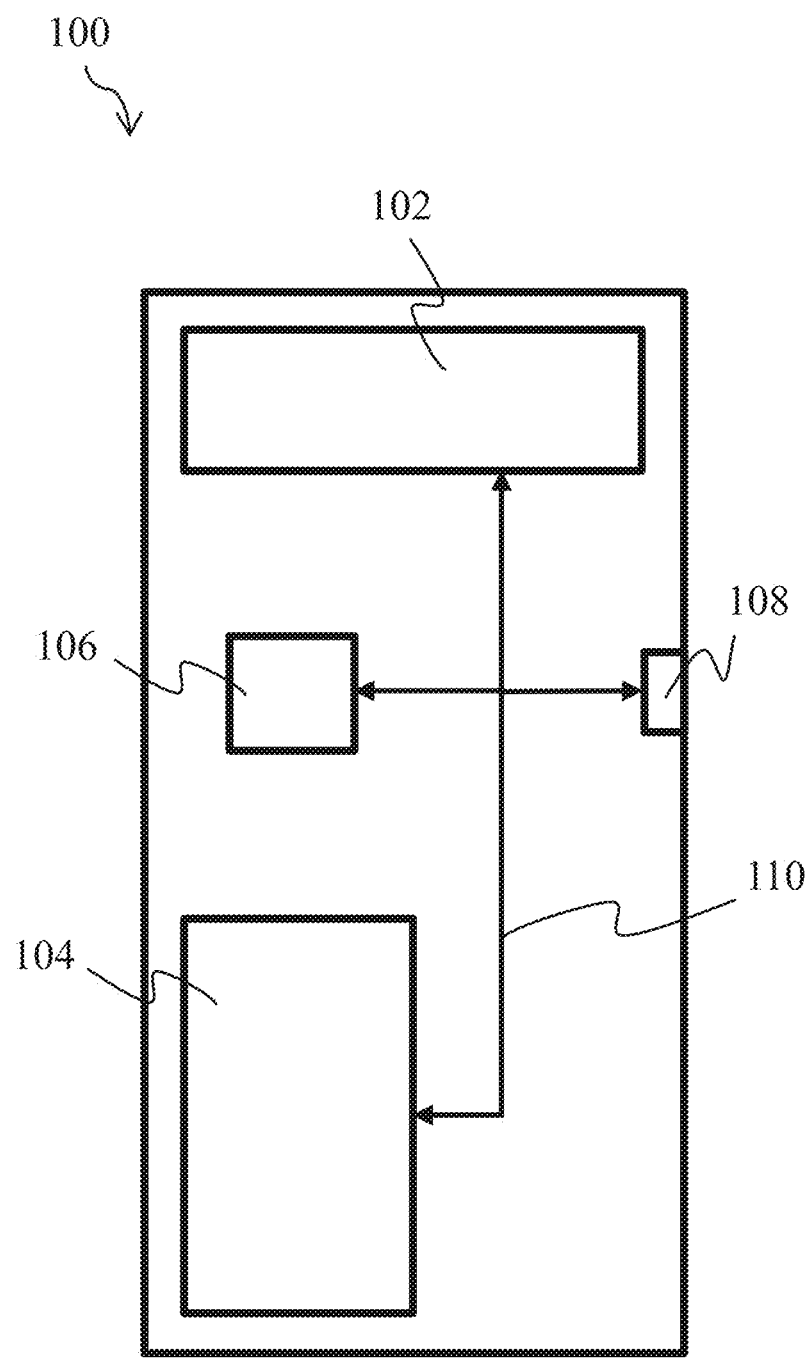
FIG. 1 of the accompanying drawings schematically illustrates an example computer system, in accordance with embodiments of the present disclosure.

FIG. 1 of the accompanying drawings schematically illustrates an example computer system 100, in accordance with embodiments of the present disclosure. The example computer system 100 comprises a computer-readable storage medium 102, a memory 104, a processor 106 and one or more interfaces 108, which are all linked together over one or more communication busses 110. The example computer system 100 may take the form of a conventional computer system, such as, for example, a desktop computer, a personal computer, a laptop, a tablet, a smart phone, a smart watch, a virtual reality headset, a server, a mainframe computer, and so on. In some embodiments, the computer system 100 may be a multi-user mainframe computer system, a single-user system, or a server computer or similar device that has little or no direct user interface, but receives requests from other computer systems (e.g., clients).

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the disclosure or computer programs that, when executed by the processor 106, cause the processor 106 to carry out a method according to an embodiment of the disclosure.

Memory 104 may include computer system readable media in the form of volatile memory, such as random access memory (RAM) or cache memory. Computer system 100 may further include other removable/non-removable, volatile/non-volatile computer system storage media. By way of example only, a storage system (not shown) can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 104 can include flash memory, e.g., a flash memory stick drive or a flash drive. Memory devices can be connected to a memory bus by one or more data media interfaces. The memory 104 may include at least one program product having a set (e.g., at least one) of program modules that are configured to carry out the functions of various embodiments.

The processor 106 may be any data processing unit suitable for executing one or more computer readable program instructions, such as those belonging to computer programs stored in the computer-readable storage medium 102 and/or the memory 104. In some embodiments, the computer system 100 may contain multiple processors (e.g., multiple CPUs) typical of a relatively large system; however, in other embodiments the computer system 100 may alternatively be a single CPU system. Each processor 106 may execute instructions stored in the memory subsystem 104 and may include one or more levels of on-board cache. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device, track-ball or keyboard). The user output interface may be arranged to provide a graphical/visual output to a user or operator of the system 100 on a display (e.g., a monitor or screen) (not shown). The processor 106 may instruct the user output interface to form an image/video signal which causes the display to show a desired graphical output. The display may be touch-sensitive enabling the user to provide an input by touching or pressing the display.

The interface 108 may additionally or alternatively comprise audio-visual interfaces. The audio-visual interfaces may be arranged to receive input from one or more audio-visual devices, such as a video camera, webcam, photographic camera or microphone. These audio-visual devices may be considered to be user input devices, to allow the user to interact with the system, as discussed above. Alternatively, these audio visual devices may be used to capture information about a particular environment for the purposes of monitoring that environment. For example, the audio-visual device may comprise a surveillance camera.

It is noted that FIG. 1 is intended to depict the representative major components of an example computer system 100. In some embodiments, however, individual components may have greater or lesser complexity than as represented in FIG. 1, components other than or in addition to those shown in FIG. 1 may be present, and the number, type, and configuration of such components may vary.

Figure 2:
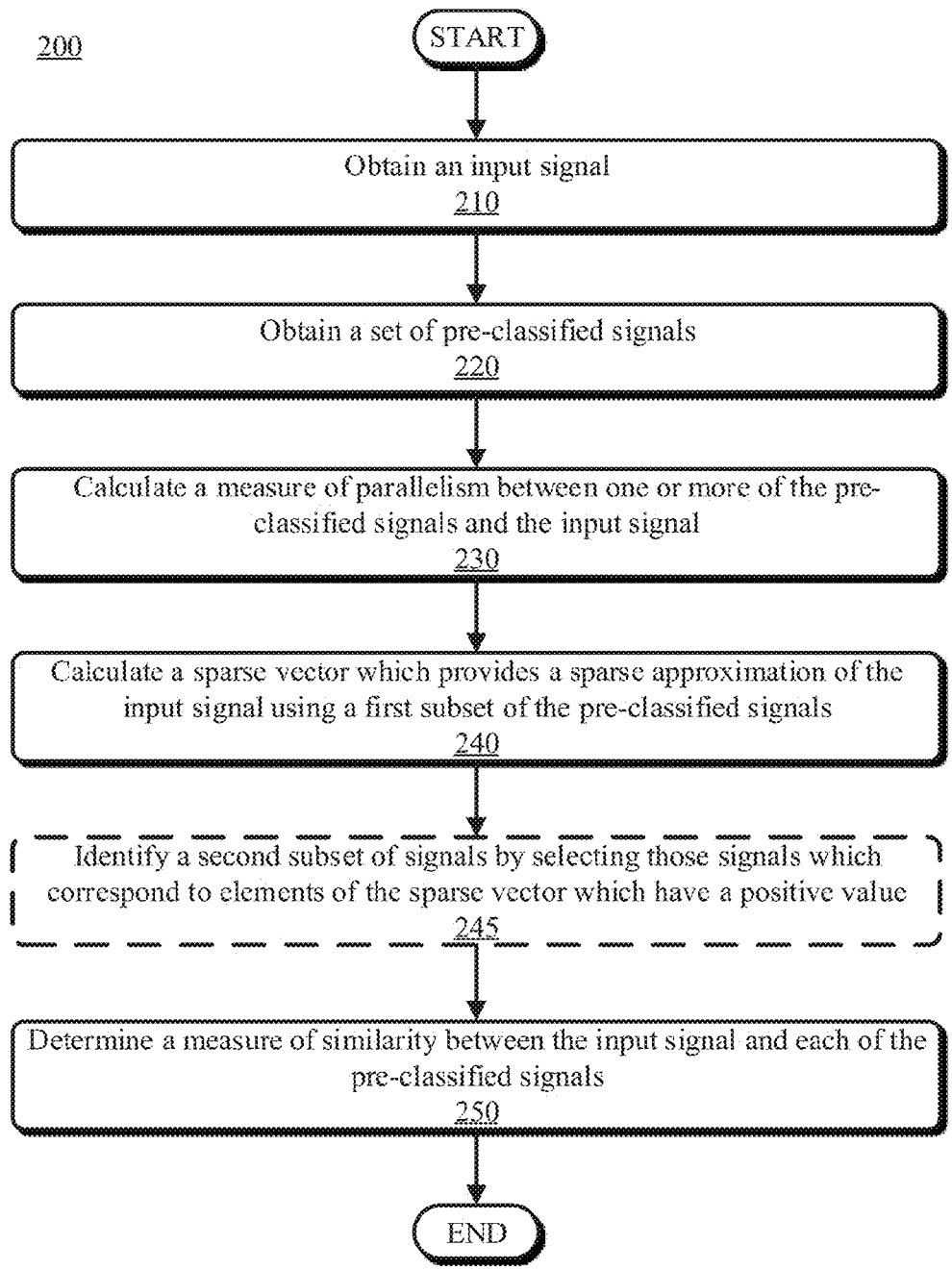
FIG. 2 is a flow diagram that schematically illustrates an example computer-implemented method for classifying an input (or probe) signal against a set of pre-classified signals, in accordance with embodiments of the present disclosure.

FIG. 2 is a flow diagram that schematically illustrates a computer-implemented method 200 for classifying an input (or probe) signal b against a set A of pre-classified signals $\{a_1, a_2, \ldots, a_i\}$, in accordance with embodiments of the present disclosure. The set of pre-classified signals may be representative of a set C of classes $\{c_1, c_2, \ldots c_n\}$, whereby each of the pre-classified signals $a_i$ may be associated with a particular class $c_n$ of which it is representative. Likewise, each of the classes $c_n$ may be represented by one or more of the pre-classified signals $a_i$.

The computer-implemented method 200 may be performed by a computer system (e.g., computer system 100 shown in FIG. 1) as part of a signal classification system (or apparatus). In some embodiments, one or more operations of the method 200 may be performed by a user, or by the computer system in response to user input. As discussed in more detail herein, it is contemplated that some or all of the operations of the method 200 described herein may be performed in alternative orders or may not be performed at all; furthermore, multiple operations may occur at the same time or as an internal part of a larger process. The method 200 may begin at operation 210, where the computer system may obtain an input signal b.

As used herein, obtaining may include, but is not limited to, receiving, retrieving, capturing, and/or acquiring. In some embodiments, the input signal b may be received by the computer system via the one or more interfaces 108. For example, the input signal b may be received from another computer system via a network. In other embodiments, the input signal b may be indicated to the computer system by the user, via a user input device, from amongst a plurality of available signals. In still other embodiments, the input signal b may be a signal that has been acquired or captured by an audio-visual device and received by the computer system via the one or more interfaces (e.g., interfaces 108 shown in FIG. 1).

After obtaining the input signal b at operation 210, the computer system may obtain a set A of pre-classified signals at operation 220. The set A of pre-classified signals may be stored locally at the computer system, such as, for example, in the computer-readable storage medium 102 or in memory 104 (shown in FIG. 1). In some embodiments, the set A of pre-classified signals may be retrieved from one or more other computer systems across a network. The set A of pre-classified signals may be a combination of pre-classified signals available from multiple sources. As such, part of the set A of pre-classified signals may be stored locally at computer system and part may be retrieved from another computer system across a network. The computer system, may add to the set A of pre-classified signals over time. For example, where the outcome of an independent identification of an input signal b is available to the computer system, the computer system, may add the input signal b to the set A of pre-classified signals as part of a supervised learning process.

At operation 230, the computer system may calculate, for one or more signals $a_i$ of the set A of pre-classified signals (i.e., for at least one of the pre-classified signals $a_i$), a parallelism (or parallel-ness) value $p_i$. In some embodiments, the computer system may calculate a parallelism value $p_i$ for each signal $a_i$ in the set A of pre-classified signals. The parallelism value $p_i$ may provide a measure of the parallelism (or parallel-ness) between that signal $a_i$ and the input signal b. This measure represents how parallel the vector representation of the input signal b is to the vector representation of a pre-classified signal $a_i$. The more parallel the input signal b is to a particular pre-classified signal $a_i$, the more similar the signals may be to each other and the higher the likelihood that the input signal b may belong to a class $c_n$ associated with that pre-classified signal $a_i$. The parallelism values $p_i$ may be calculated using the angle $\theta$ between the vector representations of the input signal b and each of the pre-classified signals $a_i$ as a measure of parallelism. This is given by the dot (or scalar) product of the two vectors which is defined by $b \cdot a_i = \|b\| \|a_i\| \cos \theta$. The term $\cos \theta$, as given by $$\frac{b \cdot a_i}{\|b\| \|a_i\|},$$

may be used directly as a measure of parallelism $p_i$ between the input signal b and a pre-classified signal $a_i$. The computer system may calculate parallelism values $p_i$ for all of the signals $a_i$ in the set A of pre-classified signals. However, this need not be the case, as discussed further below.

At operation 240, the computer system may calculate a sparse vector x for use in a linear combination with a first subset $\dot{A}$ of the set A of pre-classified signals (i.e., $\dot{A} \subseteq A$) to provide a sparse approximation of the input signal b. That is to say, the computer system may use sparse representation to find a vector x which, when multiplied with the first subset $\dot{A}$ of pre-classified signals, gives the best approximation to the input signal b (e.g., by solving $\dot{A}x=b$). This can also be represented as solving the linear expansion $b = x_1 \dot{a}_1 + x_2 \dot{a}_2 + \ldots + x_t \dot{a}_t$, whereby each of the elements $x_i$ of the vector x serves as a scalar coefficient for a respective signal $\dot{a}_t$ of the first subset $\dot{A}$ of pre-classified signals. The equation $\dot{A}x=b$ may typically be underdetermined, meaning that there is more than one vector x which could provide a solution. In some embodiments, the best approximation may be deemed to be the sparsest approximation, which is one in which the vector x is a sparse vector containing as few non-zero elements $x_i$ as possible.

In other words, the computer system may solve $\dot{A}x=b$ subject to x being as sparse as possible. The elements $x_i$ of the sparse vector x (i.e., the coefficients of the linear expansion) indicate the similarity between the input signal b and the pre-classified signal $\dot{a}_t$ associated with that element $x_i$. The pre-classified signals $\dot{a}_t$ which are associated with the largest elements $x_i$ of x tend to be the most similar to the input signal b. Therefore, the higher the value of the element $x_i$ of the sparse vector x that is associated with a pre-classified signal $\dot{a}_t$, the higher the likelihood that the input signal b belongs to the class $c_n$ associated with that pre-classified signal $\dot{a}_t$.

It will be appreciated that each pre-classified signal $\dot{a}_t$ in the first subset $\dot{A}$ of pre-classified signals may be the same as the corresponding pre-classified signal $a_i$ in the set A of pre-classified signals, and that this notation is merely used to signify the membership of the pre-classified signal $\dot{a}_t$ in the first subset $\dot{A}$ of pre-classified signals. Therefore, the value of the element $x_i$ of the sparse vector x provides an indication of the similarity between the input signal b and those pre-classified signals $a_i$ which are members of the first subset $\dot{A}$ of pre-classified signals.

The first subset $\dot{A}$ may contain a plurality of pre-classified signals from the set A of pre-classified signals. The first subset $\dot{A}$ may be a proper subset (i.e., $\dot{A} \subset A$) of the set of pre-classified signals (i.e., the first subset $\dot{A}$ may contain fewer signals than are contained in the set A of pre-classified signals). In embodiments where parallelism values $p_i$ have been calculated for all of the signals $a_i$ in the set A of pre-classified signals at operation 230, the first subset A of signals may be selected to include those pre-classified signals $a_i$ which are most parallel to the input signal b according to the parallelism values $p_i$. The first subset $\dot{A}$ of signals may be identified by selecting a predetermined number, proportion, or percentage of the most parallel signals $a_i$ from the set A of pre-classified signals. This may be achieved, for example, by ranking or listing the pre-classified signals in order of the calculated parallelism values $p_i$ and selecting the top number of signals $a_i$ to belong to the first subset $\dot{A}$ of signals so that the proportion of the number of signals in the first subset A compared to the number of signals in the set A of pre-classified signals is approximately the predetermined proportion. In these embodiments, the pre-classified signals $a_i$ that are not selected for inclusion in the first subset $\dot{A}$ will have a lower parallelism value $p_i$ than those pre-classified signals $\dot{a}_t$ in the first subset $\dot{A}$.

In some embodiments, the number of pre-classified signals $\dot{a}_t$ included in the first subset $\dot{A}$ may equate to 5%, 10% or 15% of the total number of pre-classified signals $a_i$ in the set A of pre-classified signals. However, of course, the number of pre-classified signals $a_i$ included in the first subset may lie anywhere in the ranges between those values, or indeed may correspond to any predetermined proportion of the set A of pre-classified signals (e.g., top 50%, 75%, or 90%). As another example, the predetermined proportion may be less than or equal to 5%, between 5% and 10%, or between 10% and 15% of the set of pre-classified signals. Similarly, other ways of selecting the first subset $\dot{A}$ may be used, such as, for example, by selecting only those pre-classified signals $a_i$ with a parallelism value $p_i$ which exceeds a predetermined threshold value. In some embodiments, the number, proportion, or percentage of pre-classified signals $\dot{a}_t$ included in the first subset $\dot{A}$ may be set (e.g., configured) by a user.

A standard sparse representation solver (e.g., module or application) or method/technique may be used to calculate the sparse vector x. There are a number of different types of algorithms and methods that may be used by the standard sparse representation solver. For example, the algorithm may be based on a greedy strategy approximation, such as the matching pursuit algorithm or the orthogonal matching pursuit algorithm. As another example, the algorithm may be based on a constrained optimization strategy, such as gradient projection sparse reconstruction, the interior-point method, or the alternating direction method. As a further example, the algorithm may be based on proximity optimization techniques, such as through the use of soft thresholding or shrinkage operators, the iterative shrinkage thresholding algorithm (ISTA), fast iterative shrinkage thresholding (FISTA), sparse reconstruction by separable approximation algorithms (SpaRSA), $\iota_{1/2}$-norm regularization, or augmented Lagrange multiplier based optimization algorithm. As a yet further example, the algorithm may be based on homotopy techniques, such as LASSO homotopy, basis pursuit denoising (BPDN) homotopy or iterative reweighting, $\iota_1$-norm minimization via homotopy. It will be appreciated that the above algorithms are merely examples of the kinds of algorithms that may be used by a standard sparse representation solver to calculate the sparse vector x and that other suitable algorithms may be used instead.

At operation 250, the computer system may determine a similarity value $s_i$, also referred to herein as a similarity score, indicating a measure (e.g., level) of similarity to the input signal b for each of the signals $a_i$ in the set A of pre-classified signals. For at least one of the signals $\dot{a}_\iota$ in the first subset of pre-classified signals $\dot{A}$, the similarity value $s_i$ may be determined based at least in part on the value of the corresponding element $x_i$ of the sparse vector x. This similarity value $s_i$ may be solely based on the value of the corresponding element $x_i$ of the sparse vector x—such as being equal to or proportional to this value. For at least one of the one or more pre-classified signals $a_i$ for which a parallelism value $p_i$ was calculated at operation 230, the similarity value $s_i$ may be determined based, at least in part, on the calculated parallelism value $p_i$ for that signal $a_i$. This similarity value $s_i$ may be solely based on the parallelism value $p_i$—such as being equal or proportional to this value.

In essence, at operation 250, the computer system may determine similarity values $s_i$ for the pre-classified signals $a_i$ based on a combination of the calculated parallelism values $p_i$ and the values of the elements $x_i$ of the sparse vector x. However, it will be appreciated that this does not mean that it is necessary for each individual similarity value $s_i$ to be based on both the calculated parallelism values $p_i$ and the values of the elements $x_i$ of the sparse vector x, just that the similarity values $s_i$ for the set A of pre-classified signals as a whole are based on both. In some embodiments, the similarity values $s_i$ for some of the pre-classified signals $a_i$ may be based solely on the corresponding values of the elements $x_i$ of the sparse vector x (or at least not based on calculated parallelism values $p_i$ for those signals), while the similarity values $s_i$ for the remaining pre-classified signals $a_i$ may be based solely on calculated parallelism values $p_i$ for those signals (or at least not based on values of elements $x_i$ of the sparse vector x).

For example, in some embodiments the similarity values $s_i$ for each of the pre-classified signals $a_i$ that are not in the first subset $\dot{A}$ of pre-classified signals may be determined based, at least in part, on the parallelism value $p_i$ that was calculated for that signal $a_i$ at the operation 230. In other words, the similarity value for all of the pre-classified signals $a_i$ that are in the relative complement of the first subset $\dot{A}$ with respect to the set A of pre-classified signals (i.e., A\$\dot{A}$), may be based, at least in part, on their respective parallelism values $p_i$. Meanwhile, the similarity values $s_i$ for each of the pre-classified signals $\dot{a}_\iota$ that are in the first subset $\dot{A}$ of pre-classified signals may be based at least in part on the values of the corresponding elements $x_i$ of the sparse vector x.

In other embodiments, the similarity values $s_i$ for some of the pre-classified signals $a_i$ may be based on both the calculated parallelism values $p_i$ and the values of the elements $x_i$ of the sparse vector x. Meanwhile, the similarity values $s_i$ for the remaining pre-classified signals $a_i$ may be based on just one of either the calculated parallelism values $p_i$ or the values of the elements $x_i$ of the sparse vector x.

In some embodiments, the similarity values $s_i$ may be determined by combining the calculated parallelism values $p_i$ with the elements $x_i$ of the sparse vector x where these are available for a particular pre-classified signal $\dot{a}_\iota$. Where a pre-classified signal $a_i$ does not have a corresponding element $x_i$ in the sparse vector x (e.g., where it is not part of the first subset $\dot{A}$), a suitable value, such as zero, may be used instead. For example, the parallelism values $p_i$ may be added to, or multiplied by, the corresponding elements $x_i$ of the sparse vector x. The parallelism values $p_i$ and/or the corresponding elements $x_i$ of the sparse vector x may be adjusted before being combined.

For example, where multiplication is used to combine the parallelism values $p_i$ with the corresponding elements $x_i$ of the sparse vector x, the values of the elements $x_i$ of the sparse vector x may have one added to their value, so that the zero valued elements $x_i$ act as an identity (or neutral) element in the multiplication operation. In some embodiments, a value of one may also be used for any pre-classified signals $a_i$ that do not have a corresponding element $x_i$ in the sparse vector x. In some embodiments, the parallelism values $p_i$ and corresponding elements $x_i$ may be weighted by a weighting factor before being combined.

In some embodiments, additional information (e.g., contextual information) may be available which provides an indication of the likelihood that a particular input signal b belongs to a particular class $c_n$. Therefore, the determined similarity values $s_i$ for each pre-classified signal $a_i$ may be based on such additional information (or factors) in addition to the parallelism values $p_i$ and/or the elements $x_i$ of the sparse vector x, as described above.

In some embodiments, the method 200 may include an additional operation 245 in which a second subset of signals $\ddot{A}$ may be identified from the first subset $\dot{A}$ of signals (i.e., $\ddot{A} \subseteq \dot{A}$). The second subset of signals $\ddot{A}$ may be identified by selecting those signals which correspond to elements $x_i$ of the sparse vector x which have a positive value. In other words, for each element $x_i$ of the sparse vector x that is not zero or negative, the computer system may identify the pre-classified signal $\dot{a}_\iota$ (or $a_i$) which corresponds to that element $x_i$ (e.g., the pre-classified signal $\ddot{a}_\iota$ for which that element $x_i$ serves as a scalar coefficient in the linear expansion $b = x_1 \dot{a}_1 + x_2 \dot{a}_2 + \ldots + x_\iota \dot{a}_\iota$) as belonging to the second subset $\ddot{A}$ of signals. For each of the pre-classified signals $a_i$ that are not in the second subset $\ddot{A}$ of pre-classified signals, the similarity value $s_i$ may be determined based, at least in part, on the parallelism value $p_i$ that was calculated for that signal $a_i$ at the operation 230. In other words, the similarity value may be based, at least in part, on the parallelism value $p_i$ for all pre-classified signals $a_i$ that are in the relative complement of the second subset $\ddot{A}$ with respect to the set A of pre-classified signals (i.e., A\$\ddot{A}$).

For each of the signals that are in the second subset $\ddot{A}$ of pre-classified signals (denoted herein as the signals $\ddot{a}_i$), the similarity value $s_i$ may be determined based, at least in part, on the value of the corresponding element $x_i$ of the sparse vector x. In some embodiments, the similarity value $s_i$ for these signals $\ddot{a}_i$ may be solely based on the value of the corresponding element $x_i$ of the sparse vector x—such as being equal to or proportional to this value. In such embodiments, the similarity value $s_i$ for those pre-classified signals $\dot{a}_\iota$ that are in the relative complement of the second subset $\ddot{A}$ with respect to the first subset $\dot{A}$ of pre-classified signals (i.e., $\dot{A}$\$\ddot{A}$), may be determined based on both the value of the corresponding element $x_i$ of the sparse vector x and the parallelism value $p_i$ that was calculated for that signal $\dot{a}_\iota$. In other words, the similarity value $s_i$ for pre-classified signals that are in the first subset $\dot{A}$, but not in the second subset $\ddot{A}$, may be based on both their respective value of the corresponding element $x_i$ and their parallelism value $p_i$.

However, it will be appreciated that, in some embodiments, the extent of the basis of the determination of the similarity value $s_i$ on the value of the corresponding element $x_i$ of the sparse vector x for such signals $å_i$ may simply be to determine that the value of the corresponding element is zero or negative (i.e., non-positive). Having determined that the value of the corresponding element $x_i$ of the sparse vector x is non-positive, the similarity value $s_i$ itself may be derived entirely from the parallelism value $p_i$ that was calculated for that signal $å_i$—such as being equal or proportional to this value. Of course, in other embodiments, the similarity value $s_i$ itself may be derived from both the value of the corresponding element $x_i$ of the sparse vector x and the parallelism value $p_i$ that was calculated for that signal $å_i$, as discussed herein.

The computer system may scale the parallelism values $p_i$ that were calculated for some or all of the pre-classified signals $a_i$, such as those for pre-classified signals $a_i$ that are not in the second subset Ä (i.e., for those signals in A\Ä). The similarity values $s_i$ for these pre-classified signals $a_i$ may be scaled into a suitable range. To this end, the computer system may identify a minimum positive value $x_{min}$ ($x_{min}>0$) from amongst the elements $x_i$ of the sparse vector x, and it may scale the parallelism values $p_i$ for each of pre-classified signals $a_i$ that are not in the second subset Ä of signals such that they lie in the range between zero and the minimum positive value $x_{min}$. For example, the similarity values $s_i$ for each of the pre-classified signals $a_i$ that are not in the second subset Ä of signals may be based on a scaled parallelism values given by $$\frac{p_i \times x_{min}}{p_{max}},$$

where $p_{max}$ is the maximum (e.g., highest) parallelism value.

Various scaling schemes may be used. For example, the maximum parallelism value $p_{max}$ for use in the above scaling calculation may be determined from amongst the parallelism values $p_i$ associated with the pre-classified signals $a_i$ that are not in the second subset Ä of signals (i.e., those in A\Ä). Alternatively, the maximum parallelism value $p_{max}$ may be determined from amongst the parallelism values $p_i$ associated with the pre-classified signals $a_i$ that are not in the second subset Ä of signals (i.e., those in A\Ä) and the parallelism value $p_i$ associated with the pre-classified signal $ä_i$ which is associated with the minimum positive value $x_{min}$. As yet another alternative, the maximum parallelism value $p_{max}$ may be determined from amongst the parallelism values $p_i$ associated with all of the pre-classified signals $a_i$ in the set A of pre-classified signals. Indeed, any form of scaling of the parallelism values $p_i$ for each of pre-classified signals $a_i$ that are not in the second subset Ä of signals such that they lie in the range between zero and the minimum positive value $x_{min}$ may be used (even if they do not completely cover this range).

It will be appreciated that the operation 250 need not be performed as a discrete step, and some or all of the processing performed by operation 250 may instead be performed in parallel to, or as part of, other operations. For example, as part of the operation 230 of calculating a parallelism value $p_i$ between each of the pre-classified signals $a_i$ and the input signal b, the computer system may assign a temporary similarity value $s_i$ for that signal $a_i$ based, at least in part, on the calculated parallelism value $p_i$. This temporary similarity value $s_i$ may then be replaced, as appropriate, during other steps of the method 200. For example, for those pre-classified signals $ä_i$ belonging to the second subset Ä of pre-classified signals, the temporary similarity value $s_i$ may be replaced with a similarity value $s_i$ which is based, at least in part, on the positive value of the corresponding element $x_i$ in the sparse vector x. As a further example, for those of pre-classified signals $a_i$ that are not in the second subset Ä of pre-classified signals, the temporary similarity values $s_i$ may be replaced with scaled versions of the temporary similarity values $s_i$.

The computer system may provide the similarity values $s_i$ directly as an output, thereby providing an indication of the likelihood of the input signal b being the same as each of the pre-classified signals $a_i$. Providing the output may include ranking the pre-classified signals $a_i$ in an order that is based on their respective similarity values $s_i$. In other embodiments, the computer system may identify the pre-classified signal $a_i$ that is determined to be most similar to the input signal b based on the similarity values $s_i$ and it may provide an indication of only that signal $a_i$ as an output instead. In some embodiments, the computer system may further determine, for each of the classes $c_n$ of the set C of classes, a likelihood that the input signal b belongs to that particular class $c_n$ based on the similarity values $s_i$ of the input signal b to a plurality or all of the pre-determined signals $a_i$ that are representative of that class $c_n$. The likelihoods of the input signal b belonging to each class $c_n$ may then be provided as an output. Providing the output may comprise ranking the classes $c_n$ in an order that is based on the similarity values $s_i$. In some embodiments, the computer system may determine which of the classes $c_n$ the input signal b is most likely to belong to and may provide an indication of that class $c_n$ as an output instead.

It will be appreciated that these are merely examples of the output that may be provided and that other outputs may be generated based on the determined similarity values $s_i$ instead. As will be appreciated, the output may be provided or utilized in many different ways. For example, the output might be provided directly to a user of the computer system which is performing the method 200. This could be achieved, for example, by displaying the name of the class $c_n$ to which the input signal b is determined to belong on a display of the computer system. Alternatively (or additionally), as a further example, the output may be provided to another computer system across a network. The output may be transmitted to another device (e.g., a mobile device, such as a smartphone) to which the user has access. As yet another example, the output may comprise transmitting a control signal which causes a device to act in an appropriate manner, such as, for example, causing a lock to enter an unlocked state if it is determined that it is sufficiently likely that the input signal b belongs to a particular class $c_n$, or causing the lock to remain in a locked state otherwise.

In some embodiments, the method 200 may be used for the purposes of facial recognition. For facial recognition, each class $c_n$ of the set C of classes may correspond to a known (or pre-identified) person, while each pre-classified signals $a_i$ of the set A of pre-classified signals could be a representation, such as photo, of the known person (e.g., it may be representative of the class $c_n$ which corresponds to the known person). The input signal b may be a representation, such as a photo, of an unknown person which is supplied to the system for the purposes of identification or verification (e.g., authentication).

For identification, the system may seek to determine whether the input signal b corresponds to one of the known people (or determine which of the pre-identified people the input signal b is most likely to represent). For verification, the system may be provided with an indication of a known person (e.g., an authentication target) to which the input signal b is alleged to correspond. The system may seek to determine whether the input signal b does actually represent that person (e.g., by comparing the input signal b to pre-classified signals $a_i$ associated with the class $c_n$ that corresponds to the known person) or how likely it is that the input signal b represents that person rather than anyone else. In some embodiments, the computer system may alert a user as to the results of the identification or verification. For example, the computer system may sent an output, as discussed herein, indicating whether the input signal corresponds to a known person (for identification), or indicating whether the input signal corresponds to a particular (e.g., selected) known person (for verification).

The performance of the method 200 will now be discussed in relation to its application to facial recognition. However, it will be appreciated that facial recognition is merely one exemplary application to which the method 200 may be applied and that embodiments of the disclosure may readily be applied to many other areas which involve the classification of an input signal. For example, the disclosure may be used for optical character recognition (OCR) as used, for example, in automatic number plate recognition (ANPR) systems. As another example, the disclosure may be used for other biometric applications, such as tattoo recognition.

Figure 3:
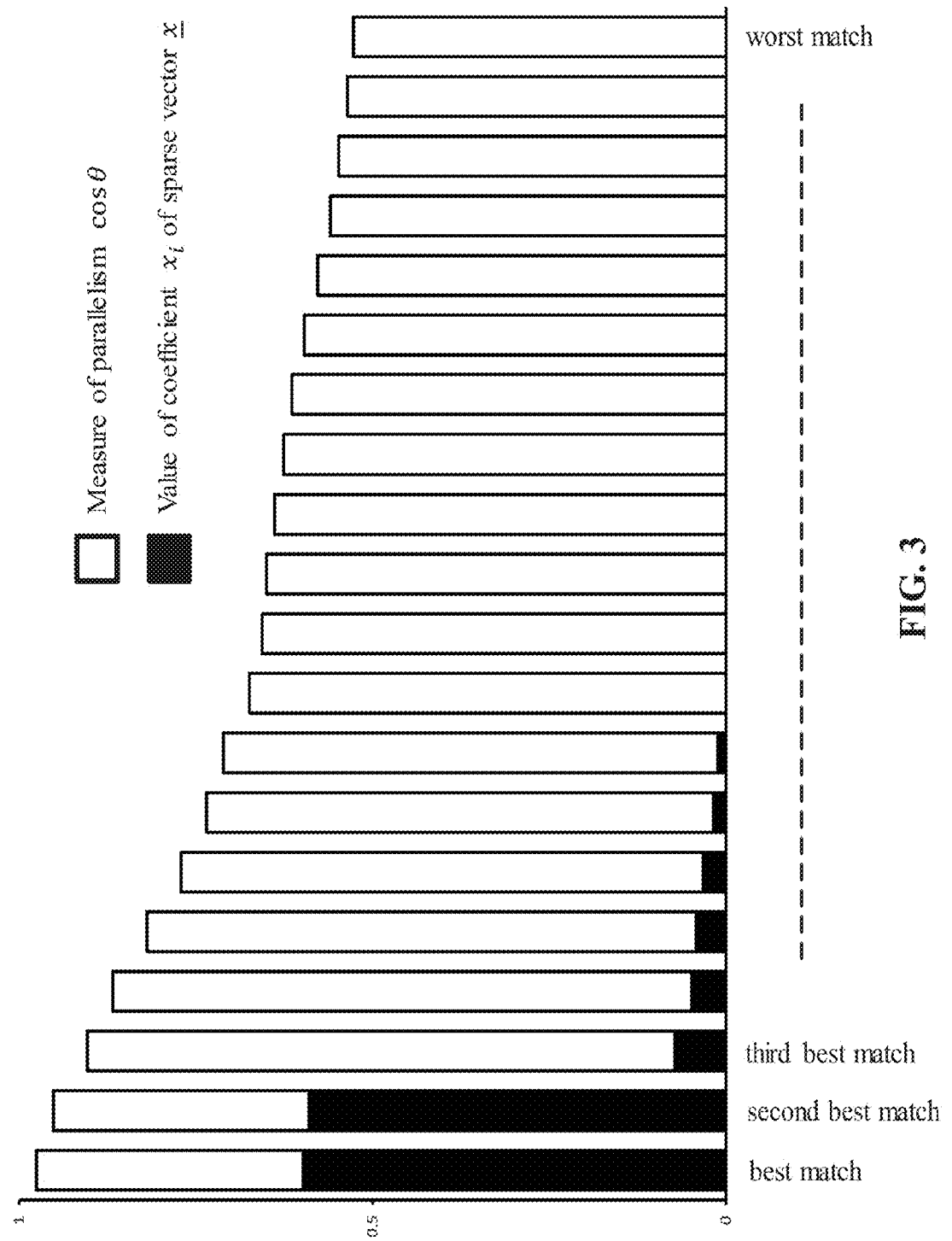
FIG. 3 is a chart that schematically illustrates example values of the calculated parallelism values and values of the elements of the sparse vector when applied to facial recognition, in accordance with embodiments of the present disclosure.

FIG. 3 is a chart that schematically illustrates example values of the calculated parallelism values $p_i$ and the values of the elements $x_i$ of a sparse vector x, as calculated by steps 230 and 250 of the method 200, respectively, in accordance with embodiments of the present disclosure. The example values were calculated for an example input signal b which is representative of a face and compared to (or classified against) a number of pre-classified signals $a_i$ which are also representative of faces. As illustrated by FIG. 3, there is a contrast between the value distributions (or responses) of the parallelism values $p_i$ and the values of the elements $x_i$ for each of the pre-classified signals $a_i$.

This contrast can be explained due to the fact that, in most signal classification problems, there will be some degree of similarity between the input signal b and most, if not all, of the pre-classified signals $a_i$. For example, in a facial recognition system, it is likely that all of the pre-classified signals will exhibit some degree of similarity because they are all representative of human faces, and all human faces exhibit some degree of similarity. As a result of this similarity, the input signal b may be roughly parallel to most, if not all, of the pre-classified signals $a_i$. Therefore, the value of cos θ, which measures the parallelism between the input signal b and each of the pre-classified signals $a_i$, will tend to vary smoothly, without any substantial step changes. In other words, the parallelism values provided by cos θ do not tend to vary by a large amount between neighbouring pre-classified signals $a_i$ when placed in order of parallelism. Therefore, there is not necessarily a large step change between the parallelism values provided by cos θ between instances of "pairs of images representing the same class" and instances of "pairs of images representing different classes."

The calculation of the sparse vector x at operation 250 also implicitly works to classify signals based on their similarity. This may be because, in optimising for the sparsest solution to the undetermined system of equations Ax=b, only those signals $a_i$ of the set A of pre-classified signals that are most useful for describing the input signal b in its entirety (e.g., within a certain level of noise) will be used. In other words, the sparse solution of Ax=b will tend to use a combination of a small number of pre-classified signals $a_i$ which are most similar, on the whole, to input signal b, rather than using a larger number of less similar pre-classified signals $a_i$, which may be more similar to the input signal b across small sub-portions, but are, on the whole, less similar. This means that the sparse vector x that is produced by a sparse representation solver may have the highest values for the elements $x_i$ that are associated with those pre-classified signals $a_i$ (e.g., which serve as coefficients for those pre-classified signals in the linear expansion $b=x_1 a_1+x_2 a_2+ \ldots +x_i a_i$) which are most similar to the input signal b. Therefore, the more parallel a pre-classified signal $a_i$ is to the input signal b, the more likely it is to have a large associated coefficient in the sparse vector x. However, due to the sparse nature of vector x that is produced by the sparse representation solver, the values of all of the other elements $x_i$ (e.g., those elements $x_i$ that are associated with those pre-classified signals $a_i$ which are less similar to the input signal b) will be zero. Therefore, the less parallel a pre-classified signal $a_i$ is to the input signal b, the more likely it is to have a zero-valued coefficient in the sparse vector x. Therefore, the value distribution (or response) of the values of the elements $x_i$ of the sparse vector x tends to be much sharper and more step-like between pre-classified signals $a_i$ that are good matches and those that are bad matches.

The sharp, step-like, response that is provided by the sparse vector x (as shown in FIG. 3) can greatly enhance the verification performance for signal classification. That is to say, the elements $x_i$ of the sparse vector x that are calculated by the sparse representation approach can more clearly indicate whether two particular signals should have the same classification or not. On the other hand, the smoother response that is provided by the parallelism values $p_i$ can provide a more robust performance in distinguishing between bad and very bad matches, as these would likely be given the same zero-value by the sparse representation approach.

FIG. 4 is a chart that schematically illustrates the match value distribution (or response) that is provided by the similarity values $s_i$ calculated by an example embodiment of the disclosure for an example input signal b which is representative of a face compared to (or classified against) a number of pre-classified signals $a_i$ which are also representative of faces. As illustrated by FIG. 4, the match value distribution provided by the similarity values $s_i$ calculated by the computer system performing the method 200 tends to exhibit a sharp step in match values at the top of the ranking (e.g., when comparing the best matches relative to each other), whilst also tending to maintain robustness in ordering the further down the ranking (e.g., when comparing the worst matches relative to each other). This enables the computer system to achieve improved performance for both verification and identification purposes, as discussed further in association with FIGS. 5A and 5B below.

Figure 5A:
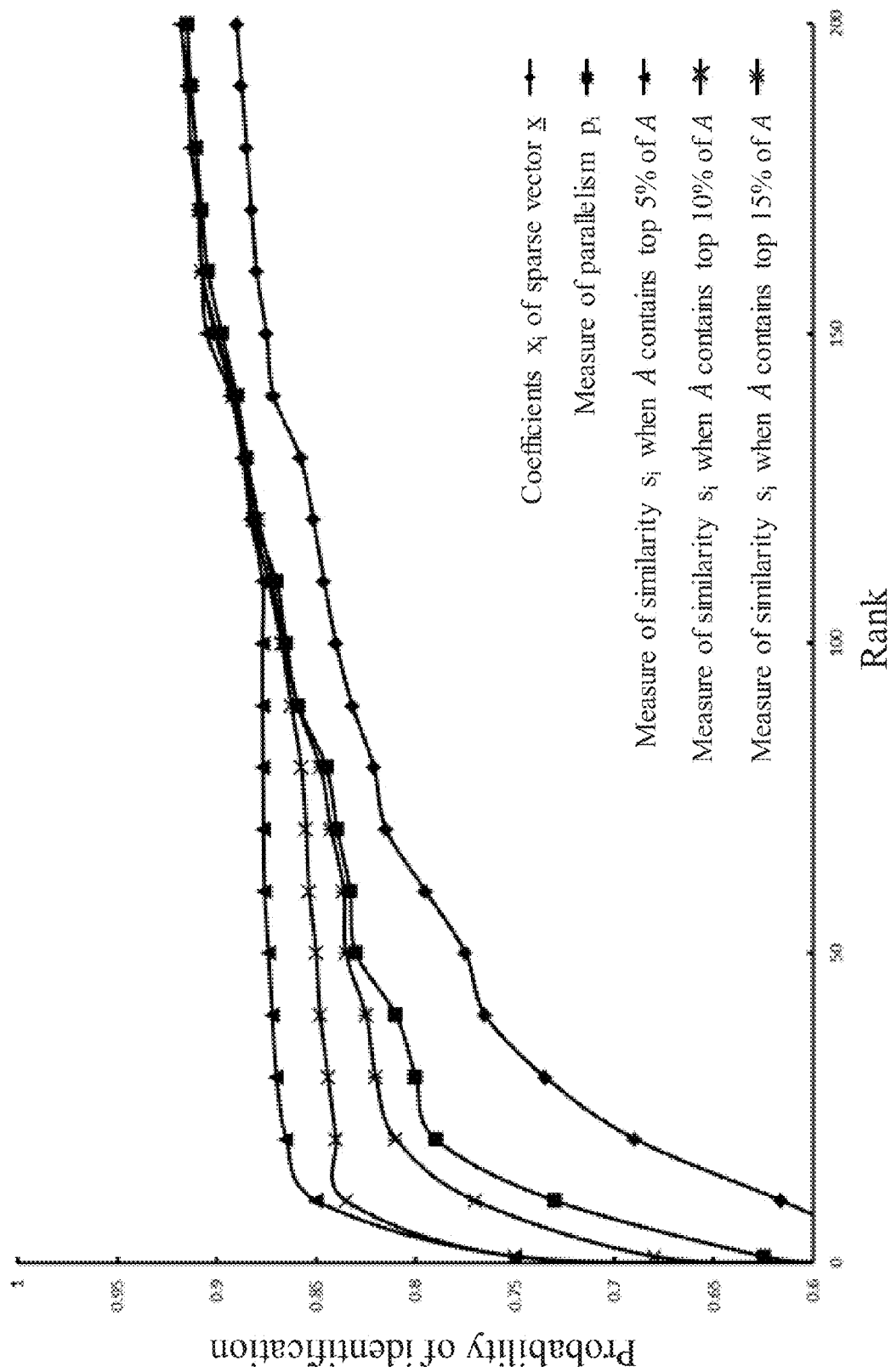
FIGS. 5A and 5B are charts which respectively schematically illustrate the identification and verification performance achieved by three different example embodiments of the disclosure when applied to facial recognition.
Figure 5B:
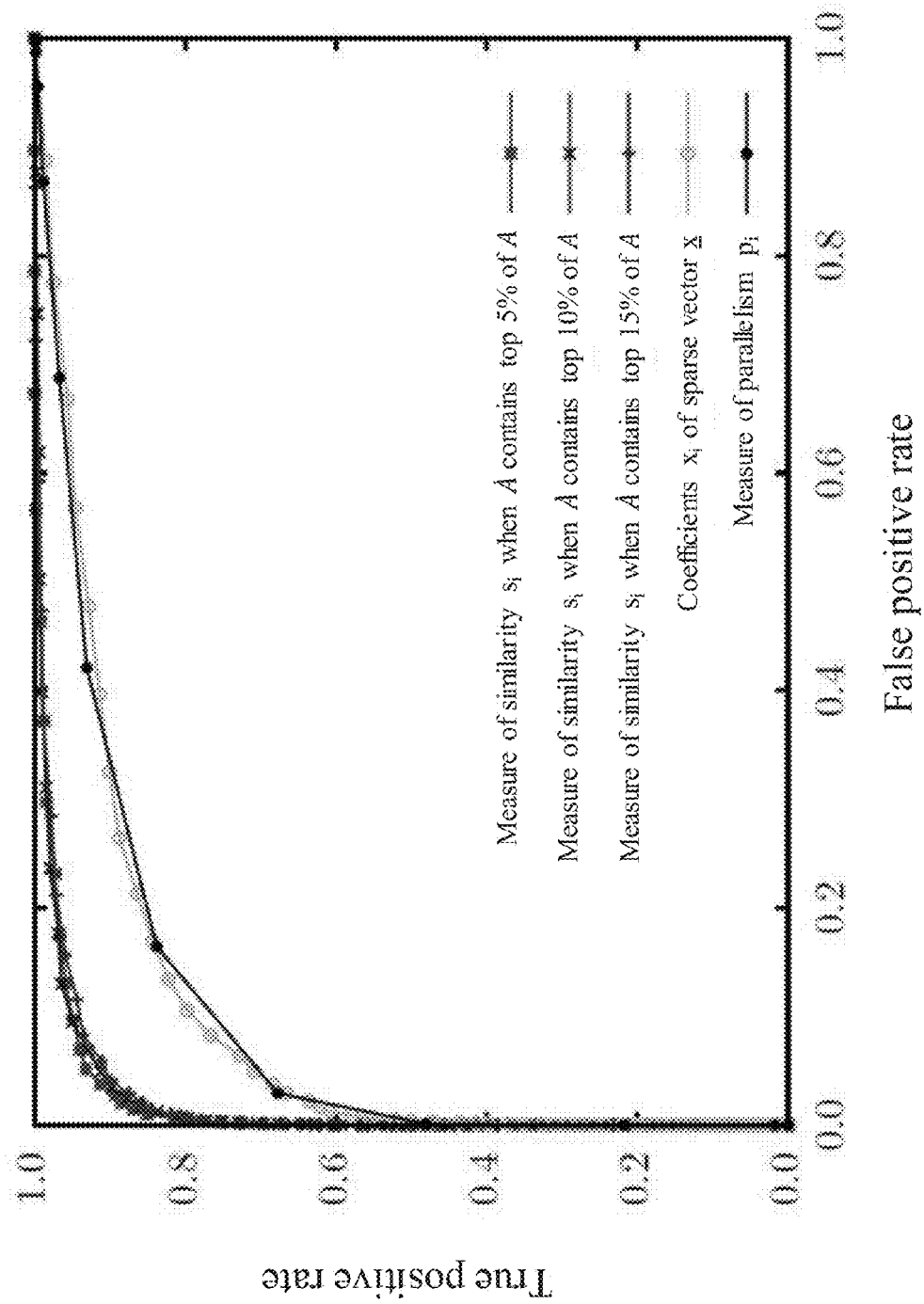

FIGS. 5A and 5B are charts that schematically illustrate test results achieved by a facial recognition system based on the similarity values $s_i$ provided by three different example embodiments of the disclosure as compared to the results that would be achieved by using the coefficients $x_i$ of the sparse vector x or the parallelism values $p_i$ (as given by cos θ) alone. The tests were performed using a database of 1900 images as the set A of pre-classified signals representing 800 different people as the set C of classes. The three example embodiments of the disclosure used in these tests differ in the proportion of the most parallel pre-classified signals $\dot{a}_t$ that are included in the first subset $\dot{A}$ of pre-classified signals in operation 240 of the method 200.

As discussed above, this first subset Å of the pre-classified signals forms the basis upon which the sparse vector x is calculated in operation 250 of the method 200. In the first example embodiment, the first subset Å of the pre-classified signals contains only the top 5% most parallel pre-classified signals (i.e., the 95 most similar images as determined by the parallelism values $p_i$ calculated at operation 230). In the second example embodiment, the first subset Å of the pre-classified signals contains the top 10% most parallel pre-classified signals (i.e., the 190 most similar images as determined by the parallelism values $p_i$ calculated at operation 230). In the third example embodiment, the first subset Å of the pre-classified signals contains the top 15% most parallel pre-classified signals (i.e., the 285 most similar images as determined by the parallelism values $p_i$ calculated at operation 230).

The similarity values $s_i$ produced by these three example embodiments are based on the identification of a second subset Ä of pre-classified signals (as described above). The similarity values $s_i$ of the signals in the second subset Ä are set to the value of the corresponding element $x_i$ in the sparse vector x. The similarity values $s_i$ of the signals not in the second subset Ä were set to the calculated parallelism values $p_i$ scaled between 0 and the minimum positive value $x_{min}$ of the elements $x_i$ in the sparse vector x.

The chart illustrated by FIG. 5A shows the cumulative match score for the identification performance of the embodiment of the disclosure. That is to say, the likelihood of correctly identifying an input signal b representing an unknown person, within a given number of ranks.

The chart illustrated by FIG. 5B shows the receiver operating characteristic for the verification performance of embodiments of the disclosure. In other words, FIG. 5B illustrates the performance of three example embodiments of the disclosure in assessing whether an image presented as an input signal b is of a particular person.

As can be seen from these charts, the curves for each of the example embodiments is further to the top left of the chart than the curves for classification based on either the coefficients $x_i$ of the sparse vector x or the parallelism values $p_i$ (as given by cos θ) alone. This means that all three of the example embodiments outperform the classification performance (e.g., having a higher true positive rate and a lower false positive rate) provided by using the coefficients $x_i$ of the sparse vector x or the parallelism values $p_i$ (as given by cos θ) in isolation. In other words, the composite approach of embodiments of the disclosure can serve to optimize or improve the receiver operating characteristic while retaining a robust cumulative match score, thereby greatly improving both the identification performance and the verification performance over that which would be provided by using either the coefficients $x_i$ of the sparse vector x or the parallelism values $p_i$ on their own.

In some embodiments of the present disclosure, the input signal may be a representation of an object, for example a face or number plate, to be identified or verified, and the pre-classified signals may be representations of known objects, for example faces of known people or known number plates respectively. The determined similarity value may be used to output an alert indicating an identification or verification status of the object.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for performing facial recognition, the method comprising:
    calculating, for one or more signals of a set of pre-classified signals, a parallelism value indicating a level of parallelism between that signal and an input signal, wherein each signal in the set of pre-classified signals is an image of a known person, and wherein the input signal is an image of a person to be identified;
    calculating, for a first subset of the set of pre-classified signals, a sparse vector, wherein each element of the sparse vector serves as a coefficient for a corresponding signal of the first subset;

determining, for each of the signals in the set of pre-classified signals, a similarity value indicating a level of similarity between that signal and the input signal,
wherein the determination of the similarity value for at least one of the signals in the first subset is based, at least in part, on the value of the corresponding element of the sparse vector, and
wherein the determination of the similarity value for at least one of the one or more signals is based, at least in part, on the calculated parallelism value for that signal;
determining which signals in the first subset of signals correspond to elements in the sparse vector that have a positive value;
identifying a second subset of signals, the second subset of signals including the signals that correspond to elements of the sparse vector having a positive value,
wherein the one or more signals for which parallelism values are calculated comprise all of the signals in the set of pre-classified signals that are not in the second subset, and
wherein the determination of the similarity value for each of the signals that are not in the second subset is based, at least in part, on the calculated parallelism value for that signal; and
identifying the known person that corresponds to the input signal.

2. The method of claim 1, wherein the one or more signals for which parallelism values are calculated comprises all of the signals in the set of pre-classified signals.

3. The method of claim 2, further comprising:
identifying the first subset of signals from the set of pre-classified signals by selecting signals which are most parallel to the input signal according to the calculated parallelism values.

4. The method of claim 3, wherein the first subset is selected such that a size of the first subset is a predetermined proportion of the set of pre-classified signals.

5. The method of claim 1, wherein the similarity value for each of the pre-classified signals in the second subset is determined based solely on the value of the corresponding element of the sparse vector.

6. The method of claim 1, further comprising:
identifying a minimum positive value of the elements of the sparse vector; and
scaling the parallelism values for each of the pre-classified signals that are not in the second subset into a range between zero and the minimum positive value,
wherein the similarity value for each of the signals in the set of pre-classified signals that are not in the second subset is determined based, at least in part, on the scaled parallelism value for that signal.

7. The method of claim 6, wherein the similarity value for each of the pre-classified signals that are not in the second subset is determined based solely on the scaled parallelism value for that signal.

8. The method of claim 1, wherein the level of parallelism for each of the one or more signals is based on a dot product between a vector representation of the input signal and a vector representation of that signal.

9. A system for performing facial recognition, the system comprising a processor configured to:
calculate, for each of one or more signals of a set of pre-classified signals, a parallelism value indicating a measure of parallelism between that signal and an input signal, wherein each signal in the set of pre-classified signals is an image of a known person, and wherein the input signal is an image of a person to be identified;
calculate, for a first subset of the set of pre-classified signals, a sparse vector for use in a linear combination with the first subset of signals to provide a sparse approximation of the input signal, wherein each element of the sparse vector serves as a coefficient for a corresponding signal of the first subset in the linear combination;
determine, for each of the signals in the set of pre-classified signals, a similarity value indicating a measure of similarity between that signal and the input signal,
wherein the determination of the similarity value for at least one of the signals in the first subset is based, at least in part, on the value of the corresponding element of the sparse vector, and
wherein the determination of the similarity value for at least one of the one or more signals is based, at least in part, on the calculated parallelism value for that signal;
determine which signals in the first subset of signals correspond to elements in the sparse vector that have a positive value;
identify a second subset of signals, the second subset of signals including the signals that correspond to elements of the sparse vector having a positive value,
wherein the one or more signals for which parallelism values are calculated comprise all of the signals in the set of pre-classified signals that are not in the second subset, and
wherein the determination of the similarity value for each of the signals that are not in the second subset is based, at least in part, on the calculated parallelism value for that signal; and
identify the known person that corresponds to the input signal.

10. The system of claim 9, wherein the one or more signals for which the processor is configured to calculate parallelism values comprises all of the signals in the set of pre-classified signals, and wherein the processor is further configured to:
identify the first subset of signals by selecting, from the set of pre-classified signals and using the calculated parallelism values, a predetermined proportion of signals which are most parallel to the input signal.

11. The system of claim 9, wherein the processor is further configured to:
identify a minimum positive value of the elements of the sparse vector; and
scale the parallelism values for each of the pre-classified signals that are not in the second subset into a range between zero and the minimum positive value,
wherein, the similarity value for each of the signals in the set of pre-classified signals that are not in the second subset is determined based, at least in part, on the scaled parallelism value for that signal.

12. A computer program product for performing facial recognition, the computer program product comprising a computer readable storage medium having stored thereon:
first program instructions executable by a processor to cause the processor to calculate, for each of one or more signals of a set of pre-classified signals, a parallelism value indicating a measure of parallelism between that signal and an input signal, wherein each signal in the set of pre-classified signals is an image of a known person, and wherein the input signal is an image of a person to be identified;
second program instructions executable by the processor to calculate, for a first subset of the set of pre-classified signals, a sparse vector for use in a linear combination with the first subset of signals to provide a sparse approximation of the input signal, wherein each element of the sparse vector serves as a coefficient for a corresponding signal of the first subset in the linear combination;

third program instructions executable by the processor to cause the processor to determine, for each of the signals in the set of pre-classified signals, a similarity value indicating a measure of similarity between that signal and the input signal, wherein the determination of the similarity value for at least one of the signals in the first subset is based, at least in part, on the value of the corresponding element of the sparse vector, and wherein the determination of the similarity value for at least one of the one or more signals is based, at least in part, on the calculated parallelism value for that signal;

fifth program instructions executable by the processor to cause the processor to identify a second subset of signals from the first subset by identifying those signals which correspond to elements of the sparse vector having a positive value, wherein the one or more signals which the first program instructions cause the processor to calculate parallelism values for comprise all of the signals in the set of pre-classified signals that are not in the second subset, and wherein the third program instructions cause the processor to determine the similarity value for each of the signals that are not in the second subset is based, at least in part, on the calculated parallelism value for that signal;

sixth program instructions executable by the processor to cause the processor to identify a minimum positive value of the elements of the sparse vector;

seventh program instructions executable by the processor to cause the processor to scale the parallelism values for each of the pre-classified signals that are not in the second subset into a range between zero and the minimum positive value, wherein, the third program instructions cause the processor to determine the similarity value for each of the signals in the set of pre-classified signals that are not in the second subset based, at least in part, on the scaled parallelism value for that signal; and eighth program instructions executable by the processor to cause the processor to identify the known person that corresponds to the input signal.

13. The computer program product of claim 12, wherein the one or more signals for which the first program instructions cause the processor to calculate parallelism values comprise all of the signals in the set of pre-classified signals, and wherein the computer program product further comprises:

ninth program instructions executable by the processor to cause the processor to identify the first subset of signals by selecting, from the set of pre-classified signals, a predetermined proportion of signals which are most parallel to the input signal according to the calculated parallelism values.

* * * * *